Oct. 31, 1939. H. F. WATKINS 2,177,967
FRUIT HANDLING MACHINE
Filed June 1, 1937 3 Sheets-Sheet 1
FIG_1_
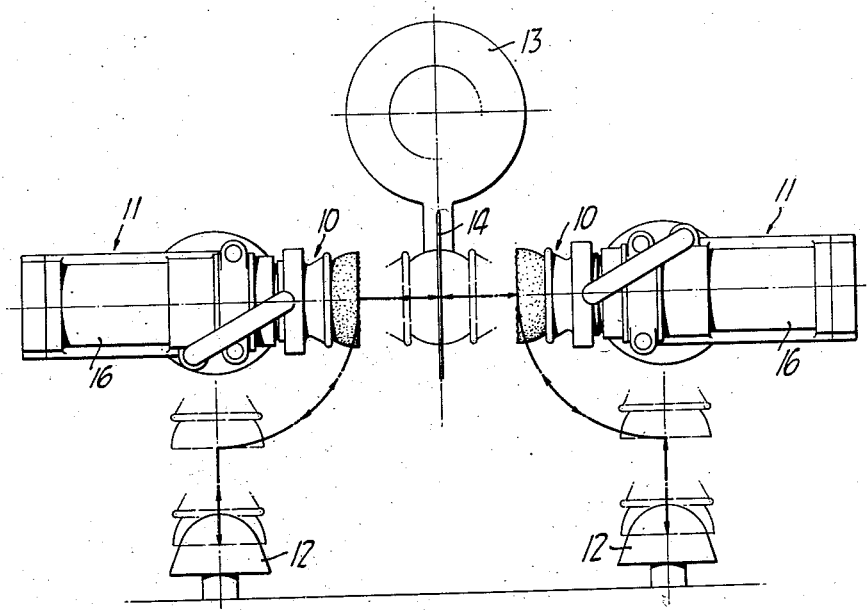
FIG_2_
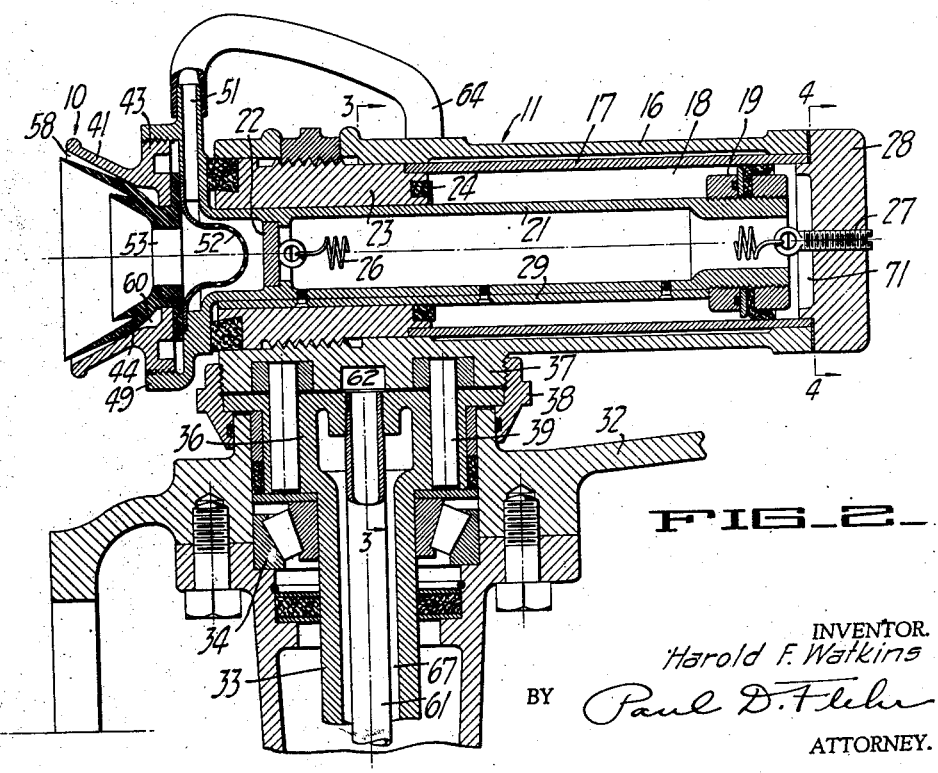
INVENTOR.
Harold F. Watkins
BY Paul D. Flehr
ATTORNEY.

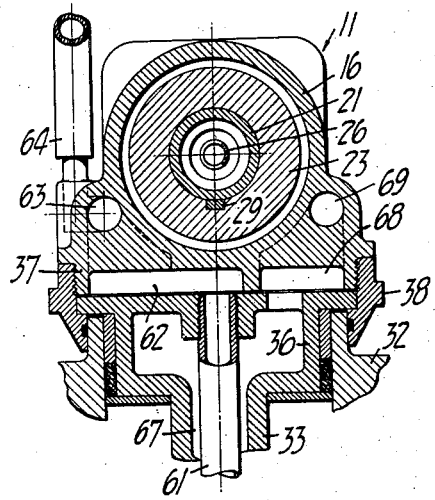
FIG_3_
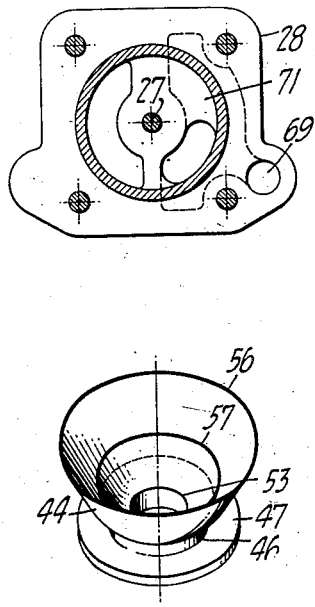
FIG_4_
FIG_6_
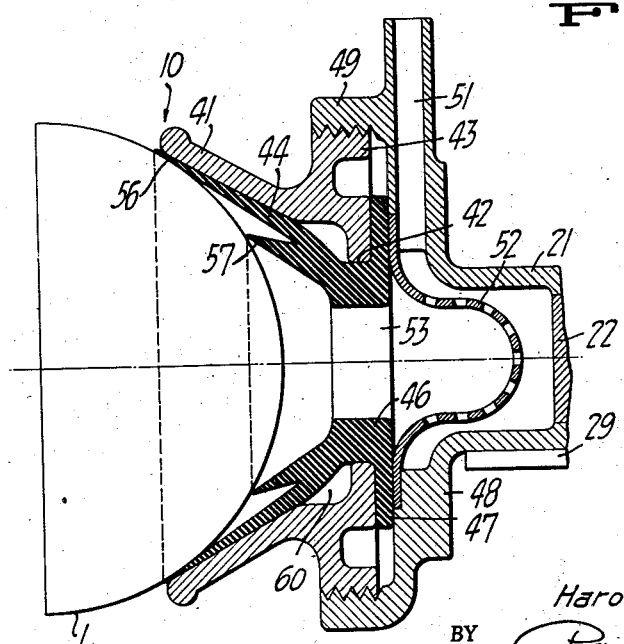
FIG_5_
INVENTOR.
Harold F. Watkins
BY
ATTORNEY.

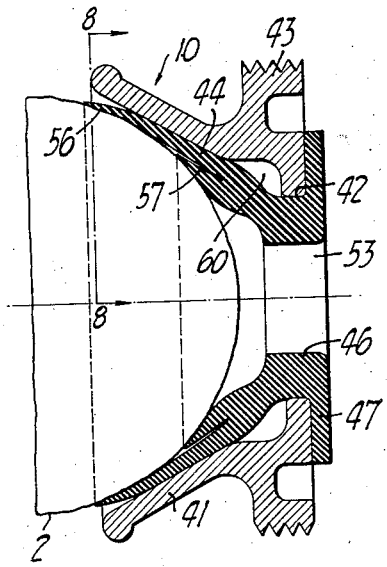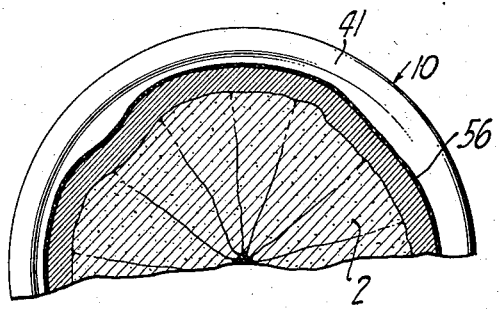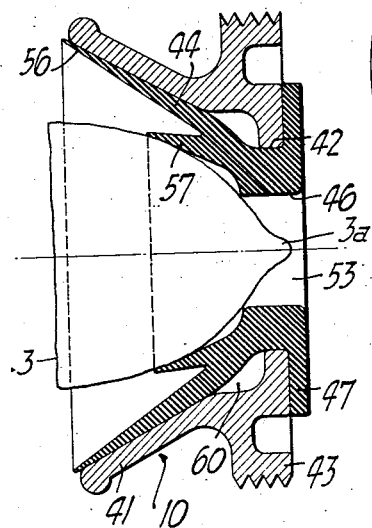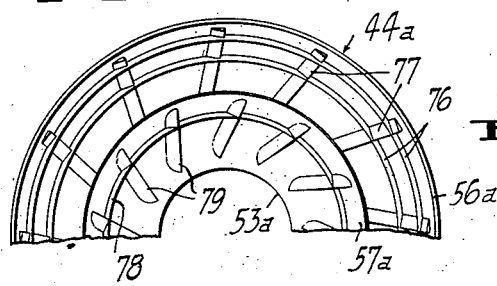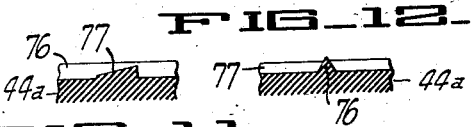

Patented Oct. 31, 1939

2,177,967

UNITED STATES PATENT OFFICE 2,177,967

FRUIT HANDLING MACHINE

Harold F. Watkins, Oakland, Calif., assignor to Watkins Fruit Machinery Company, San Francisco, Calif., a corporation of California Application June 1, 1937, Serial No. 145,765

6 Claims. (Cl. 146—3)

This invention relates generally to machines for handling fruit, and is particularly applicable to machines for extracting juices from citrus fruit, such as oranges, lemons, and grape fruit.

The subject matter disclosed herein is a continuation in part of my co-pending application Serial No. 673,585, filed May 31, 1933, now Patent No. 2,040,114, granted May 12, 1936, also co-pending application Serial No. 43,852, filed October 7, 1935, now matured into Patent No. 2,147,870, and co-pending application Serial No. 119,971, filed January 11, 1937.

Automatic machines for extracting juices from citrus fruit must necessarily embody some means for gripping halved articles of the fruit, and for applying the same upon rotating burrs or like juicing means. In the past, the fruit gripping or handling devices employed for carrying out such operations, have been unsatisfactory in many respects. For example they have not held the fruit in such a manner as to minimize breakage of the peel during a juicing operation, with the result that the peel breakage causes the juicing operation to be inefficient and uncertain, and peel oil is introduced into the fruit juice. Also the grip afforded has not been sufficiently positive for proper application of the fruit to the rotating burrs, and even if a relatively positive grip is afforded, the peel can not be quickly and positively released after a juicing operation, with the result that peel is often retained by the fruit handling devices to render the machine inoperative. Furthermore the type of fruit handling devices utilized in the past have not been capable of handling a variety of sizes of fruit, without careful alterations or adjustments to the machine. Permissible speed of operation is also a vital factor in such devices, and in the past the speed of operation has been limited, with the result that the capacity of such automatic machines has not been as great as desired.

It is an object of the present invention to provide a type of fruit handling device which will overcome the difficulties outlined above. More specifically my fruit handling device makes possible tight gripping of an article of fruit, during transference and application of the article of fruit upon a rotating burr. The fruit is held in such a manner that breakage of peel is reduced to a minimum, and a maximum amount of juice is extracted. Following the juicing operation the peel can be readily expelled from the device, without tendency of the peel to become caught upon the device to clog the machine. My device avoids piercing of the peel with fruit engaging elements, which together with peel breakage, causes undesired peel oil to be intermixed with the desired fruit juice. My device also permits relatively high speed operation, commensurate with the speed with which other functions of the machine can be carried out.

Further objects and features of the invention will appear from the following description in which the preferred embodiment of the invention has been set forth in detail in conjunction with the accompanying drawings.

Referring to the drawings:

Fig. 1 is a plan view, illustrating a pair of fruit handling devices, incorporating the present invention.

Fig. 2 is a cross-sectional detail, illustrating the manner in which one of my fruit handling devices can be mounted in a fruit juicing machine.

Fig. 3 is a cross-sectional detail taken along the line 3—3 of Fig. 2.

Fig. 4 is a cross-sectional detail taken along the line 4—4 of Fig. 2.

Fig. 5 is an enlarged cross-sectional detail, showing more clearly the construction of my fruit handling device, and the manner in which it will grip an article of fruit.

Fig. 6 is a detail view in perspective, showing a resilient rubber liner such as is employed in my device.

Fig. 7 is a cross-sectional detail similar to Fig. 5, but showing application to a different sized part.

Fig. 8 is a cross-sectional view taken along the line 8—8 of Fig. 7.

Fig. 9 is a view like Fig. 7, but showing application to a lemon.

Fig. 10 is a front view of a modified form of rubber liner having ribs.

Figs. 11 and 12 are cross-sectional details taken at right angles of the ribs shown in Fig. 10.

Referring first to Fig. 1, a pair of fruit handling devices or cup assemblies incorporating my invention, have been designated generally at 10, and are mounted in conjunction with or as a part of a pair of turret-like assemblies 11. Other elements illustrated in Fig. 1 are parts of a complete fruit handling and juicing machine, as disclosed in my co-pending application Serial No. 119,971, filed January 11, 1937. These elements include a pair of rotating burrs 12, a fruit centering cup or cone 13, and a fruit severing knife 14.

The cycle of operation of the complete machine consists of supplying an article of fruit, such as an orange, to the centering cone 13. This cone is then swung upwardly to impale the article of fruit upon the knife 14. Cups 10 are then projected inwardly upon opposite sides of the article of fruit, and while the article is so gripped knife 14 is moved a sufficient distance to completely sever the fruit. Immediately thereafter devices or cup assemblies 10 are retracted, the turret-like assemblies 11 swung in opposite directions through angles of 90°, and devices 10 then again projected to force the halved articles of fruit upon the burrs 12. Following this juicing operation cups 10 are again retracted, and the turret assemblies 11 again swung through angles of 90°, back to their original positions illustrated in Fig. 1.

A suitable detailed construction for each turret assembly 11, is illustrated in Fig. 2, and corresponds to the type of assembly disclosed in the aforementioned co-pending application Serial No. 119,971, filed January 11, 1937. Thus the assembly consists of an outer shell 16 provided with a liner 17 to form the cylinder 18. Fitted within this cylinder there is a piston 19, which is secured to the inner end of a hollow tubular member 21. The forward end of the tubular member 21 is provided with a closure disc 22, and is also adapted for the mounting of the fruit engaging device or cup assembly 10, as will be presently explained. The tube 21 is guided for reciprocation by the guide bushing 23, the inner face of which is provided with a resilient ring 24, serving as a cushion against which one face of the piston 19 may engage. The piston 19 is continuously biased towards a retracted position, by the tension spring 26. One end of this spring is secured to the closure 22, and the other end is attached to screw 27, which in turn is adjustably threaded into the head 28. A key 29 is secured to one side of the tubular member 21, and engages within a key-way formed in the bushing 23, to restrain the member 21 against rotation.

The means for journalling the assembly 11, to enable rotation through 90°, includes the following: A fixed shelf or other wall 32 of the machine, forms a support through which the shaft 33 extends. The upper end of this shaft is journalled by means of the roller bearing assembly 34, and its lower end is carried by a similar journal or bearing. The upper enlarged end 36 of the shaft 33, cooperates with the lower face of an annular pad 37, provided upon the lower side of the shell 16. The pad 37 and also the enlarged end 36, are secured together by means of the threaded ferrule 38. Relative rotation between these parts is prevented by means of the dowel pins 39.

The fruit handling device 10 can best be understood by reference to Fig. 5. It consists of a substantially conical cup-shaped member 41, formed of suitable rigid material such as a stainless metal or metal alloy. The forward end of the member 41 is open, while the smaller end is provided with a central opening 42 and a threaded flange 43. Within the cup-shaped member 41, there is a similarly shaped liner 44, formed of suitable resilient material, such as resilient vulcanized rubber or "Duprene". The smaller end of liner 44 is provided with a collar 46, which fits within the openings 42. Integral with the collar portion 46 there is also an annular flange portion 47, which is normally gripped in a manner to be presently described. The adjacent end of the hollow member 21, is provided with an enlarged end portion 48. This end portion is provided with an internally threaded annular flange 49, which is engaged by the threaded flange 43. It will be evident that the rubber flange 47 is gripped and held between the rear face of the cup-shaped member 41, and the forward face of the enlarged end portion 48. An air duct 51 is formed in the enlarged end portion 48, and is in communication with the interior of the liner 44, through the strainer 52 and the opening 53 through collar portion 46.

The rubber liner 44 is shown provided with two annular edge portions 56 and 57, which are tapered to form relatively thin edges or dips of great lateral flexibility. These tapered portions, or feathered edges, make it possible to afford an air-tight seal with the skin or peel of an article of fruit. As is shown more clearly in Fig. 2, there is normally a substantial space 58, between the liner 44 and the outer cup-shaped member 41. As will be presently explained this space enables the liner to better accommodate itself to the contour of the fruit to establish an initial seal, after which the fruit is drawn into the cup, and is virtually seated against the rigid cup-shaped member 41. Also immediately behind the base of the feathered edge or flange 57, an annular recess 60 can be provided to afford more "give" when portion 57 is engaged by an article of fruit.

Pneumatic connections are established so that either suction or pneumatic pressure can be applied to the interior of the liner 44, and pneumatic pressure intermittently applied to the piston 19 to project the devices 10 against the fruit and against the rotating burrs. Thus a pipe 61 extending through the hollow shaft 33 connects with a source of pneumatic suction. The upper end of pipe 61 communicates with a port 62 in pad 37 (Fig. 3), and this port in turn communicates with a duct 63, and a flexible pneumatic hose 64. This hose 64 in turn connects with the duct 51 (Fig. 2). A source of controlled pneumatic pressure is connected with the duct formed by the space between pipe 61 and shaft 33. Space 67 is in communication with a port 68 formed within the pad 37 (Fig. 3) and port 68 in turn communicates with a duct 69, and from thence with a chamber 71 behind the piston 19 (Figs. 2 and 4).

In the cycle of operation previously described with respect to Fig. 1, at the time the devices 10 are projected to engage the sides of an article of fruit, and virtually simultaneously with such engagement, a suction is applied to the pipe 61, and thus to the interiors of the liners 44. Assuming that the article of fruit (designated by numeral 1 in Fig. 5) may be considered of normal size with respect to the size of a fruit handling device, the outer edge portion 56 will be stretched somewhat to a larger diameter, and upon application of a vacuum to the interior of the liner 44, the relatively pliable resilient edge portion 56 will be sucked tightly against the skin of the fruit. Thus a tight seal is established with the skin of the fruit, and by virtue of outer atmospheric pressure, the severed half of the fruit is pressed inwardly with respect to the cup-shaped member 41. In effect this brings the article of fruit to the position illustrated in Fig. 5, in which the gripped half of fruit has a relatively solid bearing upon the inner face of the member 41, over a substantial annular area, with a portion of the liner being interposed between the fruit and the inner surface of the metal member 41. Venting of air under pressure, which was applied to chambers 71 at the commencement of the cycle, now permits the devices 10 to retract, and mechanism attached to the lower ends of shafts 33, causes rotation of these shafts through 90°, as previously described. Subsequently pneumatic pressure applied to chambers 71 causes devices 10 to be projected upon the rotating burrs 12, during which operation the halved articles of fruit are securely held against rotation, and have adequate bearing upon the metal cup-shaped member 41 to avoid any material breakage of the peel. During this juicing operation a halved article of fruit may somewhat better adjust itself to the contour of the cup-shaped member 41, but such adjustments do not in any way interfere with the sealing contact between the liner and the skin or peel of the fruit. Following the juicing operation and immediately after the devices 10 are retracted, momentary pneumatic pressure is applied to the interior of the liners 44, with the result that the peels are expelled.

An adequate grip will be afforded by the devices described above, even though the size of the fruit being handled by the machine may vary. For example as illustrated in Fig. 7 a considerably smaller article of fruit 2 is shown being gripped by the liner 44. In such instance the seal may be established in part by the smaller tapered edge portion 57, as well as by the larger edge portion 56.

Note that in Fig. 7 the edge portion 56 has been drawn inwardly by the applied suction, to contact and grip the adjacent surface of the fruit. This is typical operation and it will be evident that when this edge portion is drawn inward it conforms to surface irregularities such as illustrated in Fig. 8. Fig. 9 illustrates how the same device can effectively grip a lemon 3, with the protruding end 3a of the lemon extending into opening 53.

The clearance or spacing 58 previously specified, not only enables the liner to better accommodate itself to the varying contours of fruit being handled, to at all times afford a proper seal, but also enables these liners to better grip fruit which may not at all times be presented in properly aligned position for engagement. Thus even though the fruit may not be perfectly aligned they can be engaged and gripped by devices 10, whereas under similar conditions more complicated mechanical contrivances would be inoperative.

Breakage of peel is greatly minimized by application of the present invention, and in addition, the grip afforded upon the halved articles of fruit, does not in any way pierce or cut the peel, to permit discharge of peel oil. As is well known any cutting or scraping of the peel of citrus fruit, or even abrupt bending of the peel, causes discharge of considerable peel oil, which imparts an objectionable taste to citrus juice.

In some instances it is desirable to provide the inner faces of the rubber liners with ribs, to minimize possible slippage, particularly where the fruit being handled has been processed with wax or oil. Thus as shown in Fig. 10 the liner 44a has integral ribs 76, 77, 78 and 79 formed on its inner face. These ribs facilitate a better grip on the surface of the fruit. Synthetic rubber can also be used to avoid deterioration by wax or oil, as for example "Duprene".

I claim:

1. In a fruit handling machine, a substantially conical shaped cup formed of rigid material, the smaller end of said cup having an opening therethrough adapted to communicate with a source of varying gas pressure, a cup-shaped liner disposed within said relatively rigid cup, said liner being formed of resilient material like rubber and having a port communicating through the opening in said rigid cup, the side walls of said liner being normally substantially entirely spaced from the inner side surfaces of the rigid cup, the liner being also provided with means for attaching the same to the inner end of the rigid cup and affording an annular and flexible fruit engaging lip near the larger end of the rigid cup, whereby when an article of fruit is engaged with said liner and a partial vacuum applied to the interior of the liner, said article of fruit is gripped and urged in a direction into said relatively rigid cup.

2. In a fruit handling machine, a substantially conical shaped cup formed of rigid material, the larger and forward end of said cup being open and the smaller rear end having an opening extending through the same, a liner disposed within said rigid cup and formed of flexible material, said liner including a collar portion extending through the opening in said rigid cup and also a flange portion extending into engagement with the rear face of said rigid cup, said liner also being formed to provide a flexible annular fruit engaging lip.

3. In a fruit handling machine, a substantially conical shaped cup formed of rigid material, the larger end of said cup being open and the smaller end having an opening extending through the same, a liner of resilient material disposed within said cup, said liner being likewise substantially conical shaped but having its side walls substantially entirely spaced from the side walls of the rigid cup, the smaller end of the liner having a collar extending through the opening in the rigid cup and also having a flange for securing the liner to the rigid cup, said liner also affording a pair of annular fruit engaging lips faced towards the larger end of the rigid cup.

4. In a fruit handling machine, an open faced cup formed of relatively rigid material, a resilient rubber liner for the cup, the cup and the liner having a port therethrough to enable evacuation of the interior of the cup, the liner having a plurality of annular and flexible fruit engaging radially spaced lips for forming a sealed grip upon the surface of the fruit.

5. In a fruit handling machine, a cup formed of relatively rigid walls, a liner for the cup formed of resilient rubber, the cup and the liner having a port therethrough to enable evacuation of the interior of the cup, and means for retractably mounting the cup, the liner having a plurality of annular and flexible lips having their edges radially spaced and disposed generally in spaced planes substantially parallel to the face of the cup.

6. In a fruit handling machine, an open faced cup formed of relatively rigid material, a liner formed of resilient material and disposed within the cup, the cup and the liner having a port therethrough to enable evacuation of the interior of the liner, the liner being also provided with a flexible annular fruit engaging lip normally spaced laterally with respect to the adjacent walls of the cup and being disposed near the open face of the rigid cup, whereby when an article of fruit is engaged with said liner and the interior of the liner evacuated, the lip seals upon the skin of the fruit and the fruit is urged into said cup, and a conduit connected with said port for evacuation of the liner.

HAROLD F. WATKINS.